US011374986B1

(12) United States Patent
Silverstein et al.

(10) Patent No.: US 11,374,986 B1
(45) Date of Patent: Jun. 28, 2022

(54) COLLABORATIVE MEETING INTEREST ANALYZER BASED ON CAPTURE ATTEMPTS

(71) Applicant: INTERNATIONAL BUSINESS MACHINES CORPORATION, Armonk, NY (US)

(72) Inventors: Zachary A. Silverstein, Austin, TX (US); Spencer Thomas Reynolds, Austin, TX (US); Rama Krishna Vedula, McKinney, TX (US); Shikhar Kwatra, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/301,674

(22) Filed: Apr. 12, 2021

(51) Int. Cl.
*H04L 65/1083* (2022.01)
*H04L 65/401* (2022.01)

(52) U.S. Cl.
CPC ...... *H04L 65/1083* (2013.01); *H04L 65/4015* (2013.01)

(58) Field of Classification Search
None
See application file for complete search history.

(56) References Cited

U.S. PATENT DOCUMENTS

| 7,257,774 | B2 | 8/2007 | Denoue | |
| 7,707,262 | B1* | 4/2010 | Bill | G06Q 10/00 709/204 |
| 7,730,407 | B2 | 6/2010 | Chiu | |
| 8,230,343 | B2 | 7/2012 | Logan | |
| 8,407,105 | B2 | 3/2013 | Linden | |
| 8,495,496 | B2 | 7/2013 | Bastide | |
| 8,885,229 | B1* | 11/2014 | Amtrup | G06K 9/6267 358/1.18 |
| 9,113,033 | B2 | 8/2015 | Junuzovic | |
| 9,733,807 | B2* | 8/2017 | Wu | G11B 20/10527 |
| 10,573,037 | B2 | 2/2020 | Kumar | |
| 10,609,332 | B1* | 3/2020 | Turbell | H04N 7/152 |

(Continued)

OTHER PUBLICATIONS

Bloomberg, "Video Conferencing Market Worth $6.7 Billion by 2025 | CAGR: 9.2%: Grand View Research, Inc.," Aug. 1, 2019, Retrieved from the Internet: <https://www.bloomberg.com/press-releases/2019-08-01/video-conferencing-market-worth-6-7-billion-by-2025-cagr-9-2-grand-view-research-inc>, 3 pages.
Disclosed Anonymously, "Socially Biased System and Method for Sharing eMeeting Artifacts," IP.com No. IPCOM000215514D, IP.com Publication Date Mar. 6, 2012, 3 pages.
(Continued)

*Primary Examiner* — Dhairya A Patel
(74) *Attorney, Agent, or Firm* — Robert R. Aragona (57) ABSTRACT

An embodiment for analyzing user interest in presented content based on capture attempts during a meeting is provided. The embodiment may include receiving presentation content from a meeting host. The embodiment may also include analyzing one or more capture applications on a device of one or more users for a capture event in response to receiving the presentation content from the meeting host. The embodiment may further include in response to determining the capture event has occurred, identifying information relating to the capture event and the one or more users who initiated the capture event. The embodiment may also include presenting the meeting host with the information relating to the capture event and the one or more users who initiated the capture event.

17 Claims, 6 Drawing Sheets

(56) References Cited

U.S. PATENT DOCUMENTS

| | | | |
|---|---|---|---|
| 10,885,343 B1* | 1/2021 | Harkness | G06K 9/6256 |
| 10,999,504 B1* | 5/2021 | Vacquerie | H04N 5/232 |
| 11,037,284 B1* | 6/2021 | Rice | G06T 7/0002 |
| 2004/0155910 A1* | 8/2004 | Chang | G06F 3/1462 |
| | | | 345/2.1 |
| 2008/0275956 A1* | 11/2008 | Saxena | G06F 16/2358 |
| | | | 709/206 |
| 2011/0159813 A1* | 6/2011 | Mallinson | H04M 1/72427 |
| | | | 455/41.2 |
| 2016/0246999 A1* | 8/2016 | Pielot | G06F 21/6209 |
| 2016/0358030 A1 | 12/2016 | Pengelly | |
| 2017/0223066 A1* | 8/2017 | Grevers, Jr. | H04L 65/1083 |
| 2018/0196588 A1* | 7/2018 | Wang | G06F 3/0488 |
| 2018/0310994 A1* | 11/2018 | Baldauf | A61M 25/00 |
| 2019/0251342 A1* | 8/2019 | Zhao | H04L 65/403 |
| 2019/0303879 A1* | 10/2019 | Mankovskii | G06F 3/167 |
| 2019/0370927 A1* | 12/2019 | Frenkel | G06F 9/453 |
| 2020/0174874 A1* | 6/2020 | Yamada | G06F 11/0751 |
| 2020/0320478 A1 | 10/2020 | Crawford et al. | |
| 2021/0211575 A1* | 7/2021 | Grant | H04N 5/23229 |
| 2021/0249117 A1* | 8/2021 | Pan | G16H 30/20 |
| 2022/0021680 A1* | 1/2022 | Roedel | H04N 5/23206 |
| 2022/0078379 A1* | 3/2022 | Iwazaki | G06V 20/56 |

OTHER PUBLICATIONS

Disclosed Anonymously, "System to Enable Presenter Feedback using Mobile Devices,"IP.com No. IPCOM000201706D, IP.com Publication Date, Nov. 18, 2010, 3 pages.

Grand View Research, "Video Conferencing Market Size Worth $8.56 Billion by 2027," Apr. 2020, Retrieved from the Internet: <https://www.grandviewresearch.com/press-release/global-video-conferencing-market>, 6 pages.

IBM, "Watson Natural Language Understanding," [accessed Jan. 25, 2021], Retrieved from the Internet: <https://www.ibm.com/cloud/watson-natural-language-understanding>, 6 pages.

IBM, "Watson Media," [accessed Jan. 25, 2021], Retrieved from the Internet: <https://video.ibm.com/>, 5 pages.

Lloyd, "How to Tell if Your Snapchat Was Screenshotted," wikiHow, Dec. 28, 2018, Retrieved from the Internet <https://www.wikihow.com/Tell-if-Your-Snapchat-Was-Screenshotted>, 10 pages.

Mell et al., "The NIST Definition of Cloud Computing", National Institute of Standards and Technology, Special Publication 800-145, Sep. 2011, 7 pages.

Parviainen et al., "A Web Based History Tool for Multicast e-Meeting Sessions," Conference: Multimedia and Expo, 2004. ICME '04. 2004 IEEE International Conference on, vol. 1, 5 pages.

* cited by examiner

COLLABORATIVE MEETING INTEREST ANALYZER BASED ON CAPTURE ATTEMPTS

BACKGROUND

The present invention relates generally to the field of computing, and more particularly to a system for analyzing user interest in presented content based on capture attempts during a meeting.

Video conferencing through a variety of desktop and mobile collaborative meeting applications, as well as collaborative meeting browser extensions, has become an effective interaction and communication tool that enables both small and large-scale companies to reduce travel and operational costs incurred in conducting in-person meetings. Demand for remote workforce management using these collaborative meeting applications has increased steadily in recent years due to rapid globalization. Such software is extremely helpful in bridging the distance between individuals in these small and large-scale companies and allowing them to view presented content in real-time. Unprecedented growth in telemedicine, development of startup ecosystems, and increased numbers of students completing degrees online in both developed and emerging economies are expected to continue the demand for these collaborative meeting tools in the coming decades.

SUMMARY

According to one embodiment, a method, computer system, and computer program product for analyzing user interest in presented content based on capture attempts during a meeting is provided. The embodiment may include receiving presentation content from a meeting host. The presentation content may be indexed upon display to one or more users. The embodiment may also include analyzing one or more capture applications on a device of the one or more users in response to receiving the presentation content from the meeting host. The embodiment may further include determining whether the capture event has occurred. The embodiment may also include in response to determining the capture event has occurred, identifying information relating to the capture event.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for analyzing user interest in presented content based on capture attempts during a meeting. The following described exemplary embodiments provide a system, method, and program product to, among other things, detect capture events and, accordingly, present a meeting host with information relating to the capture event. Therefore, the present embodiment has the capacity to improve the technical field of e-conferencing applications by tailoring presentation content to what is most relevant to individual users, thus making online collaborative meetings more efficient.

As previously described, video conferencing through a variety of desktop and mobile collaborative meeting applications, as well as collaborative meeting browser extensions, has become an effective interaction and communication tool that enables both small and large-scale companies to reduce travel and operational costs incurred in conducting in-person meetings. Demand for remote workforce management using these collaborative meeting applications has increased steadily in recent years due to rapid globalization. Such software is extremely helpful in bridging the distance between individuals in these small and large-scale companies and allowing them to view presented content in real-time. Unprecedented growth in telemedicine, development of startup ecosystems, and increased numbers of students completing degrees online in both developed and emerging economies are expected to continue the demand for these collaborative meeting tools in the coming decades. It is often difficult to properly engage an audience in such online collaborative meetings with relevant content. For example, a majority of audience members may find a particular slide in a presentation to be unimportant. This problem is typically addressed by notifying someone who is sharing content when an individual takes a screenshot of that content. However, sending someone, e.g., a meeting host, a notification fails to capture additional metadata correlating screenshots with the content that is being displayed. Also, sending someone a notification fails to consider large scale online collaborative meeting settings where there could be hundreds of individuals attending a presentation. It may therefore be imperative to have a system in place to keep track of capture events in an online collaborative meeting setting. Thus, embodiments of the present invention may provide advantages including, but not limited to, providing data to a meeting host about what content is relevant, compiling metadata about when a capture event occurs, and allowing a meeting host to customize their presentation content. The present invention does not require that all advantages need to be incorporated into every embodiment of the invention.

According to at least one embodiment, when a meeting host is giving a presentation, presentation content may be received from the meeting host, and a user may request that any attempt by the user to capture the presentation content be monitored. In response to receiving the presentation content from the meeting host and the request from the user to monitor the capture event, one or more capture applications may be analyzed in order to determine whether the capture event has occurred. According to at least one embodiment, the capture event may be a screenshot of the presentation content. According to at least one other embodiment, the capture event may be a recording of the presentation content. In response to determining the capture event has occurred, information relating to the capture event may be identified along with the user who initiated the capture event so that such data may be presented to the meeting host. According to at least one embodiment, this information may include a number of times the capture event has taken place. According to at least one other embodiment, this information may include time metadata about when the capture event occurs. According to at least one further embodiment, this information may include a correlation of the time metadata with a captured slide in the presentation content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to detect capture events and, accordingly, present a meeting host with information relating to the capture event.

Figure 1:
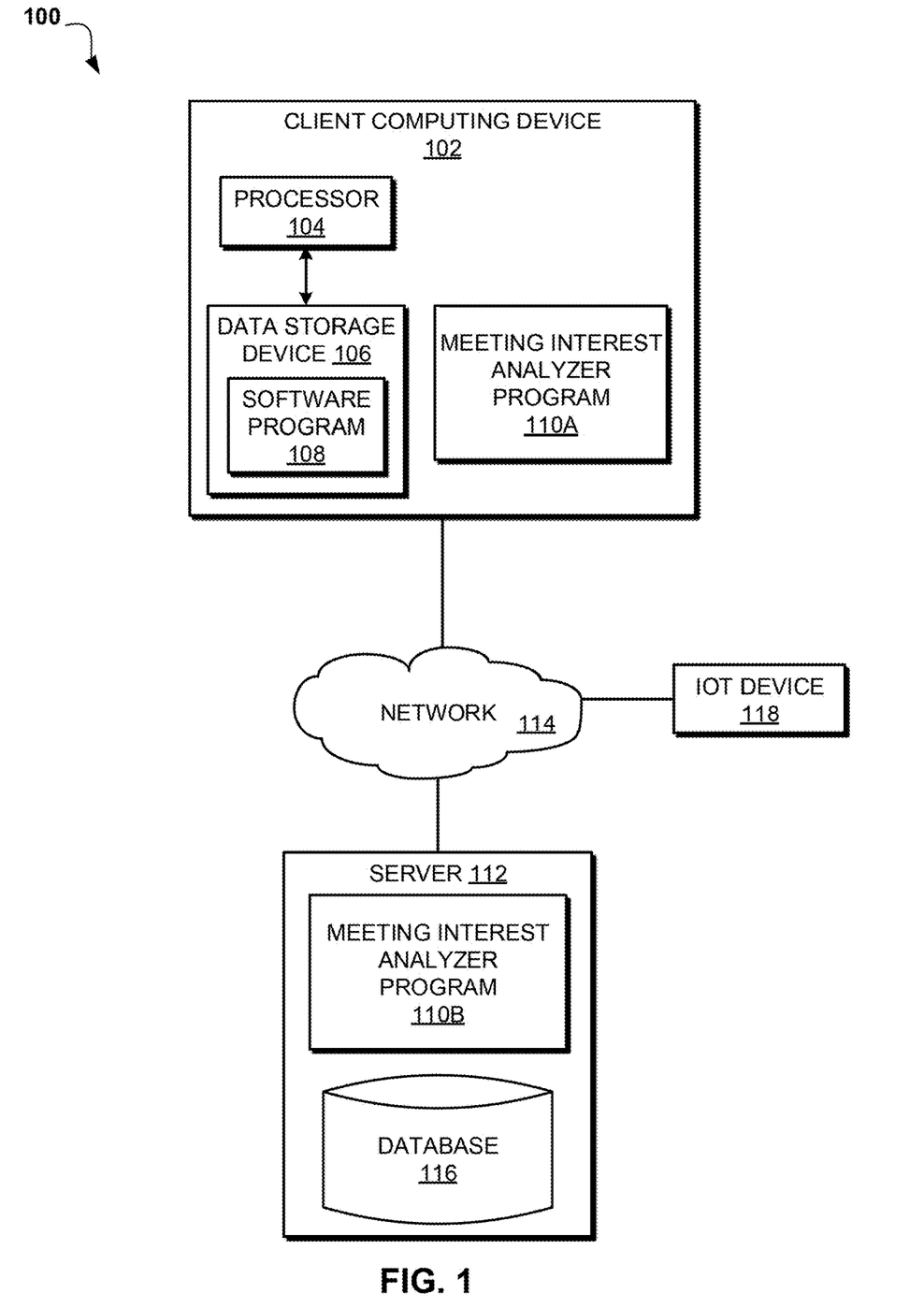
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a meeting interest analyzer program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a meeting interest analyzer program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a microphone embedded in or external to the client computing device 102, and/or any other IoT Device 118 known in the art for capturing audio output that is capable of connecting to the communication network 114, and transmitting and receiving data with the client computing device 102 and the server 112.

According to the present embodiment, the meeting interest analyzer program 110A, 110B may be a program capable of receiving a request from a user to monitor a capture event, determining whether a capture event has occurred, presenting a meeting host with information relating to a capture event, providing data to a meeting host about what content is relevant, compiling metadata about when a capture event occurs, and allowing a meeting host to customize their presentation content. The meeting interest analyzation method is explained in further detail below with respect to FIG. 2.

Figure 2:
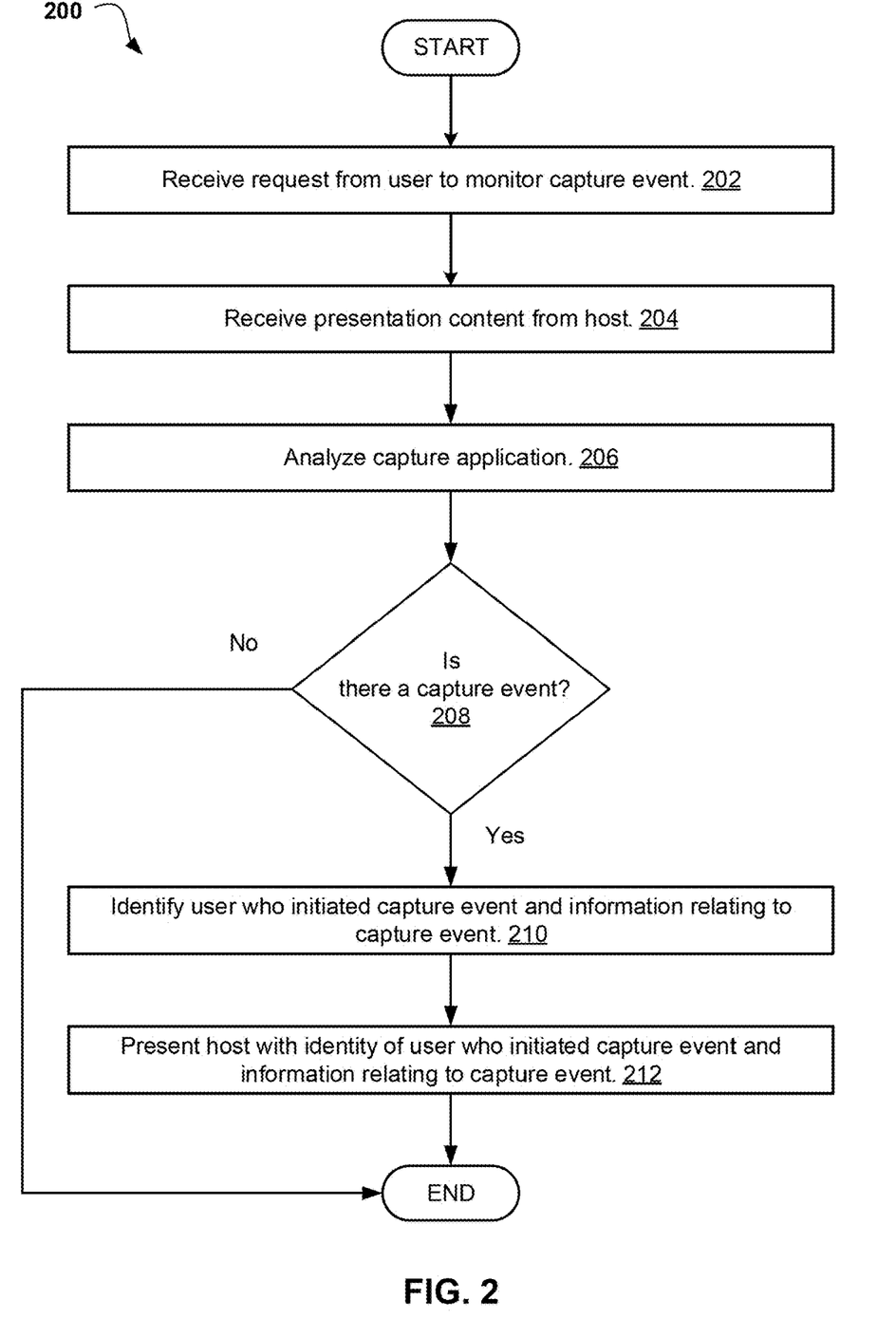
FIG. 2 illustrates an operational flowchart for analyzing user interest in presented content during a meeting in a user interest analyzation process according to at least one embodiment.

Referring now to FIG. 2, an operational flowchart for analyzing user interest in presented content during a meeting in a user interest analyzation process 200 is depicted according to at least one embodiment. At 202, the meeting interest analyzer program 110A, 110B receives the request from the one or more users to monitor a capture event. As used herein, "capture event" means a screenshot of the presentation content and/or a recording of the presentation content. When using an online collaborative meeting application, such as Cisco Webex® (Cisco Webex and all Cisco Webex-based trademarks and logos are trademarks or registered trademarks of Cisco Systems, Inc. and/or its affiliates), a meeting host may display presentation content to an audience, i.e., the one or more users. These users may find certain portions of the presentation content to be of interest, and may wish to capture such presentation content for future reference. Upon logging into the collaborative meeting application, the one or more users may opt-into, via a user interface (UI), allowing the meeting interest analyzer program 110A, 110B to monitor the client computing device 102 for the capture event. It may be appreciated that "opt-into" and "request" are used interchangeably herein. For example, when logging into a collaborative meeting application for a company meeting, a pop-up may be displayed to the user asking the user permission to monitor their attempted captures. If the user accepts, the request, i.e., the opt-in, may be received by the meeting interest analyzer program 110A, 110B and the user's capture events may be monitored. If the user declines, the user may still be able to capture the presentation content, but such capture events may not be monitored. Details on monitoring for the capture event are explained in further detail below with respect to step 206.

Then, at 204, the meeting interest analyzer program 110A, 110B receives the presentation content from the meeting host. Once the presentation content is received from the meeting host, the presentation content is indexed and stored in a database, such as database 116, upon display to the one or more users. Utilizing the software program 108, the meeting host may upload the presentation content to be displayed to the one or more users. According to at least one embodiment, the presentation content may be indexed in an ad-hoc manner by the meeting interest analyzer program 110A, 110B. For example, Walter may be the meeting host in a company meeting on sales results for the first quarter of the calendar year. Walter's presentation content may be in slide format, and individual slides "1," "2," "3," "4," and so on may be displayed to the one or more users sequentially. As slides "1," "2," "3," "4," are displayed, a screenshot may be captured and indexed by the meeting interest analyzer program 110A, 110B one at a time until the presentation is complete. According to at least one other embodiment, the presentation content may be indexed by the meeting interest analyzer program 110A, 110B integrating with ".pdf," ".ppt," and/or ".doc" software applications when these applications are open and screen sharing is taking place. Continuing the example above where Walter is giving a presentation, slides "1," "2," "3," "4," and so on may be opened in a ".pdf" application. The meeting interest analyzer program 110A, 110B may integrate with the open ".pdf" application and index some or all of the slides that are included in the presentation content.

In the present embodiment, at 206, the meeting interest analyzer program 110A, 110B analyzes the one or more capture applications for the capture event. The one or more capture applications are analyzed in response to receiving the presentation content from the meeting host. According to at least one other embodiment, the one or more capture applications may be analyzed in response to the request from the one or more users to monitor the capture event. Examples of a capture application include, but are not limited to, a snipping tool, an operating system (OS) level service for screenshotting, e.g., print screen button, an OS level service for recording, e.g., video recorder application, a camera application, and/or any application known in the art for capturing images. It may be appreciated that in embodiments of the present invention, the camera application may be capable of taking still images as well as video recordings. Continuing the example above where Walter is giving a presentation, these capture applications may be analyzed throughout the duration of the presentation. The analyzation of the one or more capture applications may be used to determine whether the capture event has occurred, explained in further detail below with respect to step 208. Such capture applications may be monitored and analyzed for one or more of the following:

A detected spike in the utilization of the one or more capture applications. The detected spike in utilization may include a spike in memory resources required by the capture application, a spike in the focus of the capture application on particular content, and/or a spike in opening or closing the capture application during a timeframe, e.g., opening the snipping tool three times in the past twenty minutes. Continuing the example, the meeting interest analyzer program 110A, 110B may detect a spike in memory resources required by the snipping tool from 1% to 8%.

A detected screenshot and/or recording sound emanating from the one or more capture applications. The sound may be any sound known in the art that indicates a capture event has occurred. For example, many smartphone and desktop cameras make a noise when a recording begins or a picture is taken. Continuing the example above where Walter is giving a presentation, the user may take a screenshot of slide "6" with their smartphone, and the smartphone may make a noise when the button is pressed to take the screenshot. Alternatively, the user may use their smartphone to take a picture of the content on their personal computer (PC). In either embodiment, a sound may be made by the camera application and detected by the meeting interest analyzer program 110A, 110B. In order to detect the sound, the IoT Device 118, such as a microphone embedded in or external to the client computing device 102, may be deployed and integrated with the meeting interest analyzer program 110A, 110B. In another example, the user may press the print screen button on their PC and the OS may output a sound which may be received by the IoT Device 118.

Next, at 208, the meeting interest analyzer program 110A, 110B determines whether the capture event has occurred. The determination is made based on a result of the analyzation of the one or more capture applications described above with respect to step 206. According to at least one embodiment, for example, if the user takes a screenshot using their smartphone or snipping tool, a sound may emanate from the one or more capture applications and the meeting interest analyzer program 110A, 110B may determine the sound is indicative of a capture event. According to at least one other embodiment, for example, the user may record the presentation content for approximately five minutes using a video recorder on their PC. As the recording is taking place, the memory being used by the capture application, i.e., the video recorder, steadily increases. Also, the analysis may detect that the battery consumption attributed to the video recorder has increased from a base level. Accordingly, the meeting interest analyzer program 110A, 110B may determine this consumption of resources is indicative of a capture event. In response to determining the capture event has occurred (step 208, "Yes" branch), the user interest analyzation process 200 may proceed to step 210 to identify information relating to the capture event. In response to determining the capture event has not occurred (step 208, "No" branch), the user interest analyzation process 200 may end.

Then, at 210, the meeting interest analyzer program 110A, 110B identifies information relating to the capture event. The identified information may include, but is not limited to, a number of times the capture event has taken place, time metadata about when the capture event occurs, a correlation of the time metadata with a captured slide in the presentation content, any open or in-focus applications on the client computing device 102, and/or any other information about the capture event that can be used to enhance online collaborative meetings.

For example, the user may take a screenshot of slide "5" at "00:21:53" minutes into the presentation. This time metadata may be correlated with slide "5" and stored in a database, such as database 116. Additionally, this time metadata may be appended to the captured slide. Continuing the example, "00:21:53" may be appended to slide "5," i.e., "00:21:53" may appear somewhere in slide "5" along with the presentation content.

In another example, there may be 50 users attending an online collaborative meeting. Ten of them may take a screenshot of slide "5." In this example, ten represents the number of screenshots that have taken place. Similar to the example above, the number of times the screenshots have taken place may be stored in the database and may also be appended to the captured slide.

According to at least one other embodiment, the one or more users who initiated the capture event may also be identified in addition to the information relating to the capture event. The one or more users may be identified from their user profile in the collaborative meeting application. Continuing the example above, John Doe may be the user who took a screenshot of slide "5" at "00:21:53." Thus, in the example, John Doe may be identified as the user, indexed, and this information may be stored in the database. Depending on the user's privacy settings, the name of the user may also be appended to the slide they captured. Continuing the example, "John Doe" may be appended to slide "5." According to at least one further embodiment, where the user prefers anonymity, only the initials of the user may be indexed and may also be appended to the captured slide. Continuing the example, "JD" may be appended to slide "5." The user may request anonymity when making the request to monitor the capture event, described above with respect to step 202.

According to yet another embodiment, a time varying-convolutional neural network (TV-CNN) module may be deployed to analyze sequential frame differences between the captured slide and on-screen content immediately prior to the capture event. As described above with respect to step 204, the presentation content may be indexed and stored in the database when displayed to the one or more users. It may be appreciated that the meeting interest analyzer program 110A, 110B may capture the presentation content regardless of whether there is a capture event. Thus, a given frame of a captured slide may be compared with a given frame of the on-screen content immediately prior to the capture event. Image segmentation may be executed on the sequential frames and may identify one or more relevant portions of the captured slide. In embodiments of the present invention, a frame may change whenever movement is detected on the screen. For example, in a presentation the information contained in a slide may not be displayed all at once. Continuing the example, bullet "1" may appear, then bullet "2" may appear, then bullet "3" may appear, and so on as directed by the meeting host. The change in the number of bullets may be indicative that a frame change has taken place. In such instances, it may be desirable to know which portions of the slide the user found relevant in order to provide better feedback to the meeting host, described in further detail below with respect to step 212. Continuing the example, the user may take a screenshot or start a recording as soon as bullet "3" appears in the slide. Thus, in this example, the frame at which the capture event occurs, i.e., the frame with the third bullet, may be compared with the frame immediately prior to the capture event, i.e., the frame with the second bullet. In this manner, the meeting interest analyzer program 110A, 110B may detect that the third bullet is relevant to the user. Depending on configuration settings provided by the meeting host, the screenshot or recording taken by the user, when stored in the database, may be stored with only bullet "3" appearing in the slide or with bullets "1," "2," and "3" appearing in the slide. It may be appreciated that a minor frame change, such as a cursor moving from one location to another location on the screen, may not be utilized in determining what presentation content is relevant to the user.

In the present embodiment, at 212, the meeting interest analyzer program 110A, 110B presents the meeting host with the information relating to the capture event and the identity of the one or more users who initiated the capture event. The information relating to the capture event as well as the identity of the one or more users may be presented to the meeting host via the UI on the meeting host's device as a post-meeting summary report. The post-meeting summary report may contain the information described above with respect to step 210, such as the number of times the capture event has taken place, the time metadata about when the capture event occurs, the correlation of the time metadata with the captured slide in the presentation content, and/or any open or in-focus applications on the client computing device 102. Also, the post-meeting summary report may contain the identity of the one or more users who initiated the capture event. Depending on the privacy settings of the one or more users described above with respect to step 210, the user's full name or initials may appear in the post-meeting summary report. Additionally, as described above with respect to step 210, the entire presentation content in a slide screenshotted or recorded by the user, or only the relevant portions of the presentation content in such a screenshotted or recorded slide may be presented to the meeting host in the post-meeting summary report.

Figure 3:
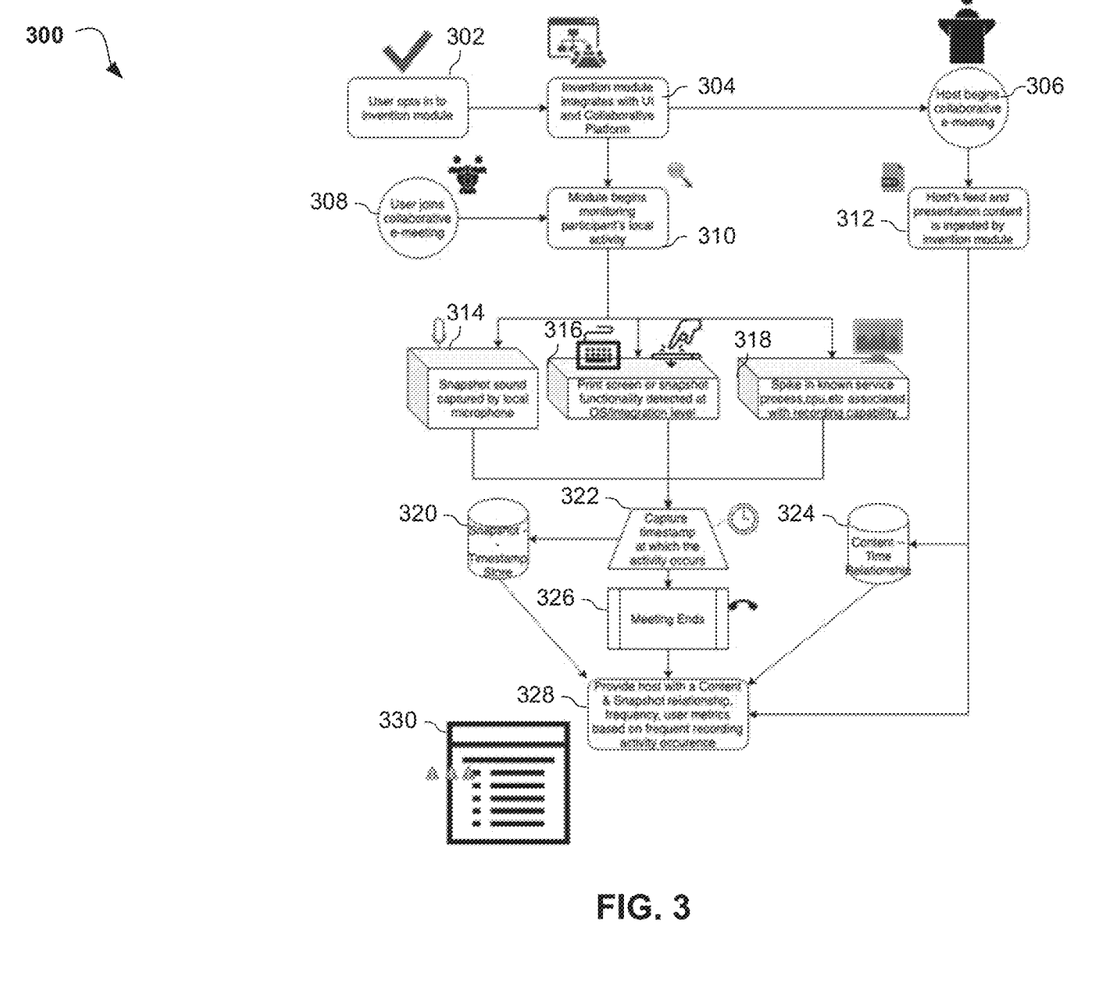
FIG. 3 is a diagram depicting an interaction between solution components of the process in FIG. 2 according to at least one embodiment.

Referring now to FIG. 3, a diagram 300 depicting an interaction between solution components of the process in FIG. 2 is shown according to at least one embodiment. When the user opts into the invention module 302, i.e., the meeting interest analyzer program 110A, 110B, the invention module may integrate with the UI of the user's device and the collaborative meeting application 304. When the meeting host begins the collaborative e-meeting 306, the host's feed and presentation content may be ingested by the invention module 312, and the presentation content may be indexed and stored in the database 116 (FIG. 1) along with a time relationship of when the presentation content was indexed 324. The user may be able to join the collaborative e-meeting 308 when the meeting host begins the collaborative e-meeting 306 and the invention module may commence monitoring the user's activity 310 for the capture event. In monitoring the user's activity 310, the invention module may use the IoT Device 118 (FIG. 1), such as the microphone, to listen for screenshot sounds 314. Additionally, the invention module may detect usage of the print screen button or some other screenshot functionality at the OS level 316. Furthermore, the invention module may detect a spike in the utilization of known capture applications associated with screenshotting or recording capability 318. The screenshot sounds 314, usage of the print screen button or other screenshot functionality at the OS level 316, and the spike in the utilization of known capture applications 318 may be indicative that the capture event has occurred. Once the capture event has occurred, a timestamp of the capture event may be recorded 322 and the screenshot or recording may be indexed and stored in the database 116 (FIG. 1) along with the timestamp 320. At the end of the collaborative e-meeting 326, the meeting host may be presented 328 with the recorded timestamp of the capture event 322 and the time relationship of when the presentation content was indexed 324 in the form of a post-meeting summary report 330. The post-meeting summary report 330 may be used by the meeting host as feedback about which aspects of the presentation content the user found most relevant.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
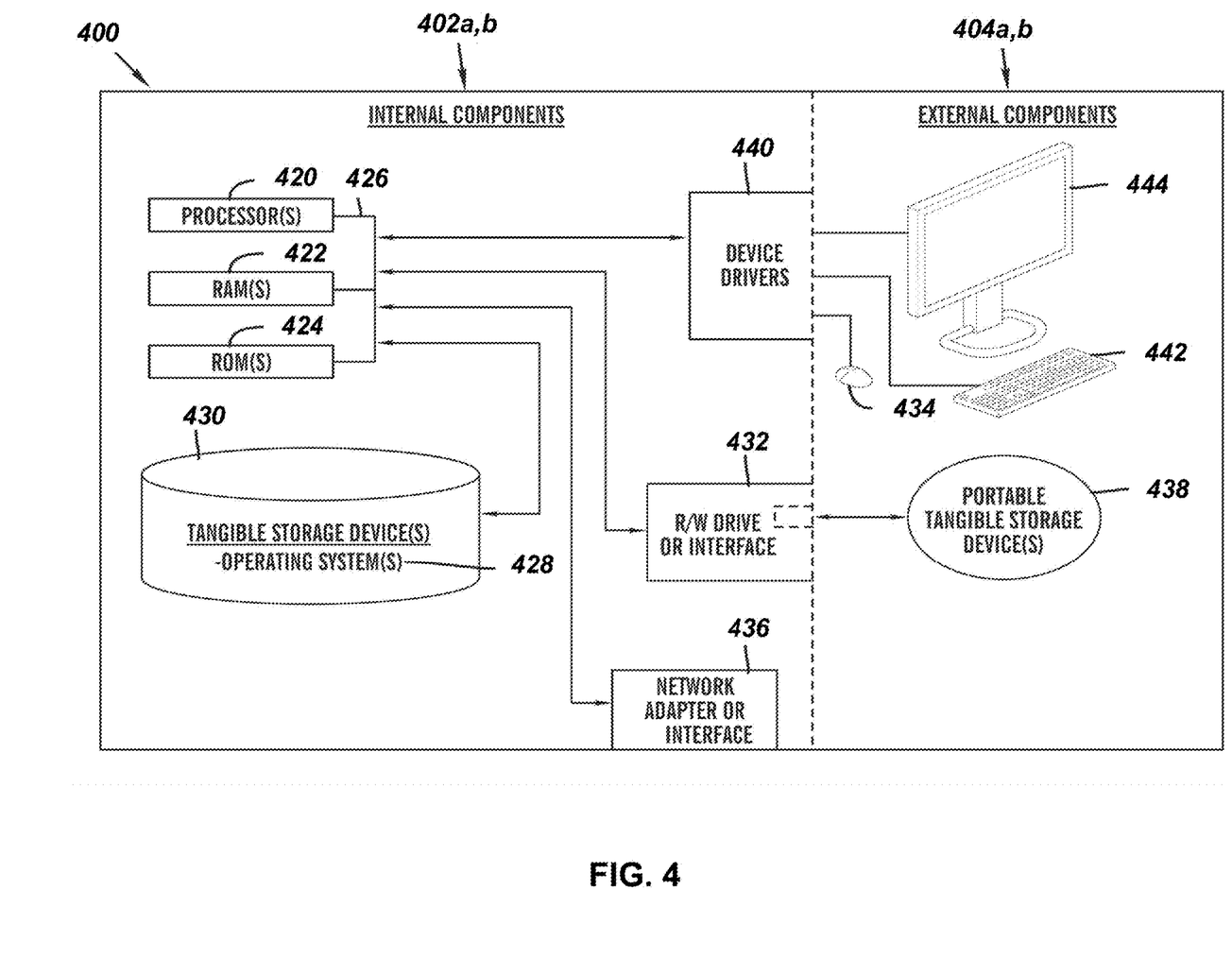
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the meeting interest analyzer program 110A in the client computing device 102 and the meeting interest analyzer program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the meeting interest analyzer program 110A, 110B, can be stored on one or more of the respective portable computer-readable tangible storage devices 438, read via the respective RAY drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the meeting interest analyzer program 110A in the client computing device 102 and the meeting interest analyzer program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the meeting interest analyzer program 110A in the client computing device 102 and the meeting interest analyzer program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
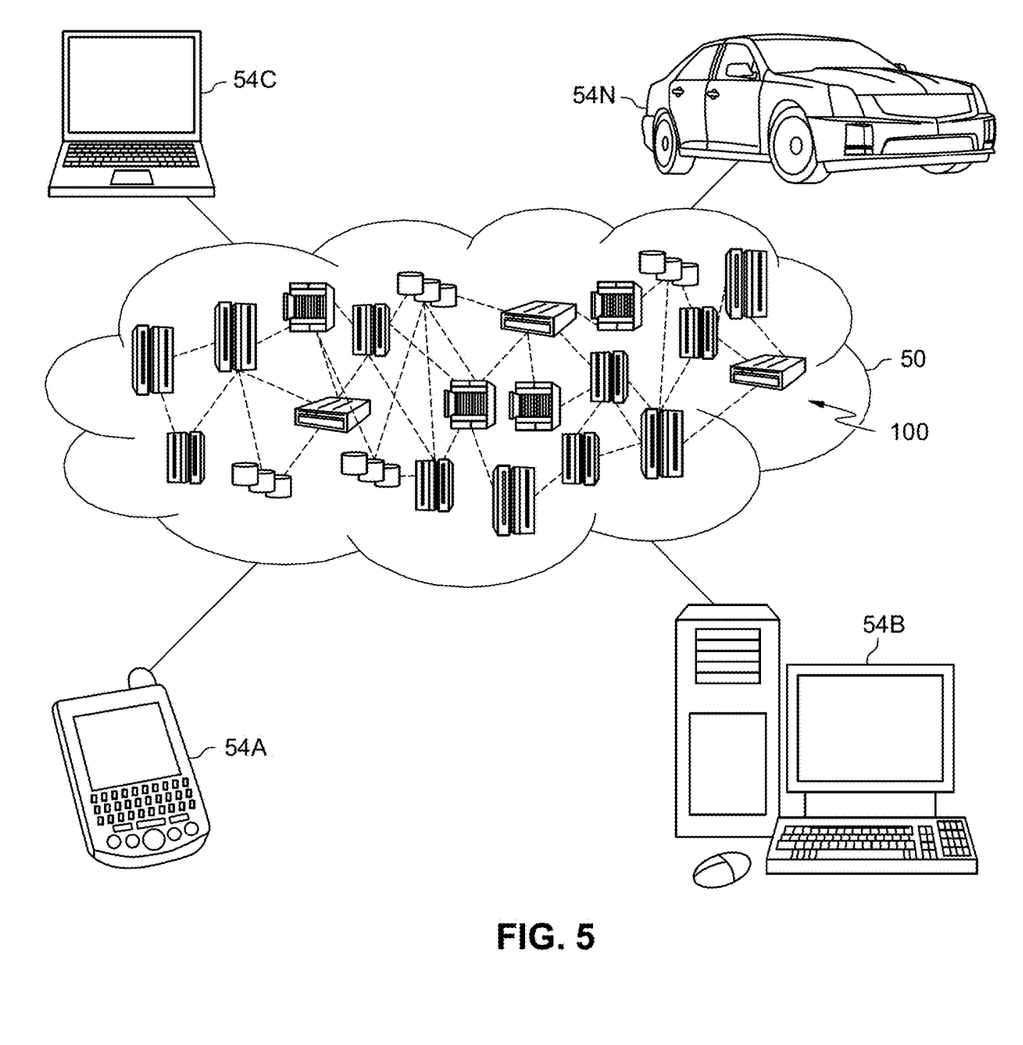
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
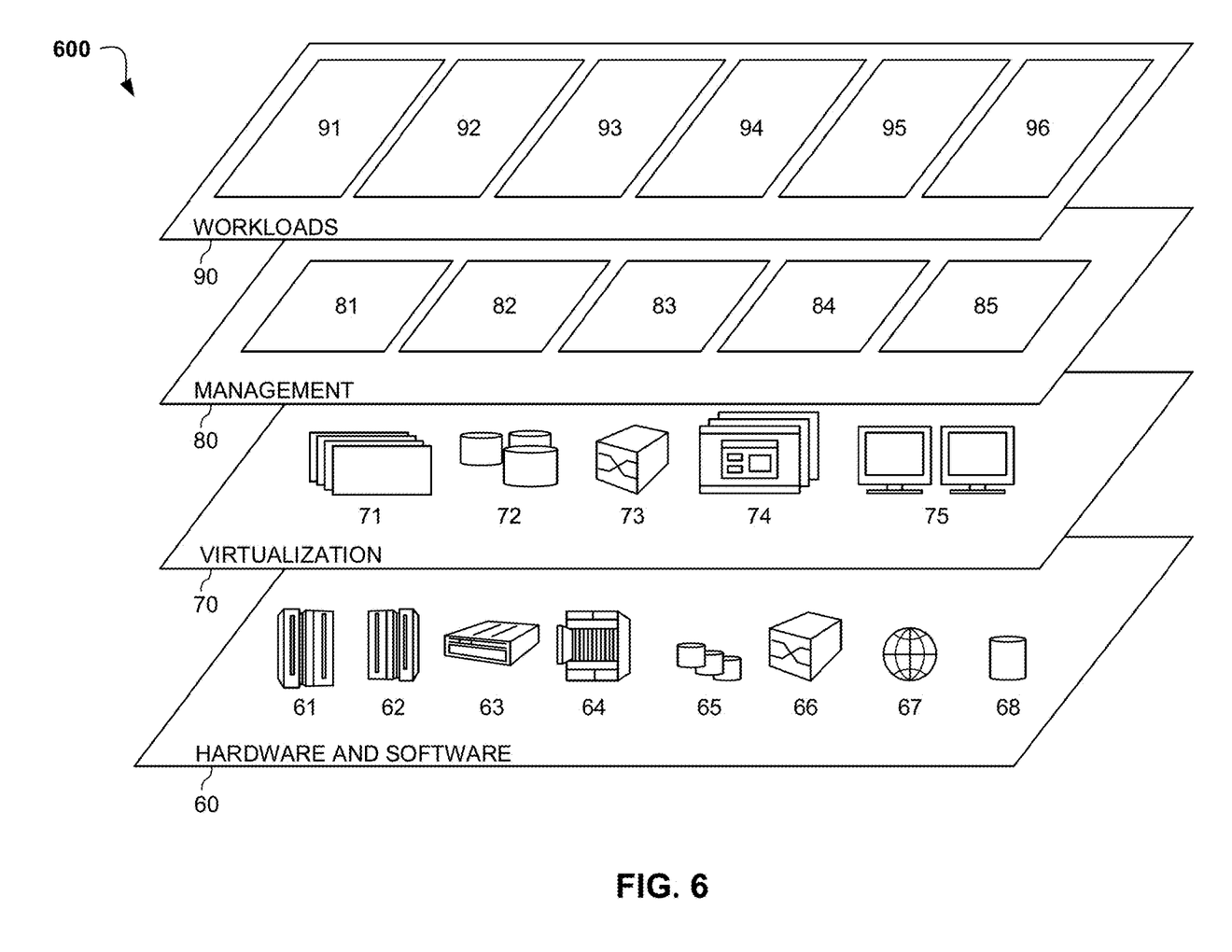
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analyzing user interest in presented content based on capture attempts during a meeting 96. Analyzing user interest in presented content based on capture attempts during a meeting 96 may relate to detecting capture events in order to present a meeting host with information relating to the capture event.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of analyzing user interest in presented content based on capture attempts during a meeting, the method comprising:
   receiving a request from one or more users to monitor for a capture event during an online collaborative meeting;
   receiving presentation content from a meeting host, wherein the presentation content is indexed upon display to the one or more users;
   analyzing one or more capture applications on a device of the one or more users for the capture event in response to receiving the presentation content from the meeting host;
   determining whether the capture event has occurred based on the analyzed one or more capture applications, wherein the capture event is determined to have occurred when a screenshot sound emanating from the one or more capture applications is detected by a microphone integrated into the online collaborative meeting, and when a spike in utilization of memory resources required by the one or more capture applications and a spike in an opening and closing of the one or more capture applications during a timeframe is detected; and
   in response to determining the capture event has occurred, identifying information relating to the capture event.

2. The method of claim 1, wherein identifying the information relating to the capture event further comprises:
   identifying the one or more users who initiated the capture event.

3. The method of claim 2, further comprising:
   presenting the meeting host with the information relating to the capture event and the identity of the one or more users who initiated the capture event.

4. The method of claim 1, wherein the capture event is selected from a group consisting of a screenshot of the presentation content, and a recording of the presentation content.

5. The method of claim 1, wherein the information relating to the capture event includes:
   a number of times the capture event has taken place;
   time metadata about when the capture event occurs; and
   a correlation of the time metadata with a captured slide in the presentation content.

6. The method of claim 5, wherein a time varying-convolutional neural network (TV-CNN) analyzes sequential frame differences between the captured slide and on-screen content immediately prior to the capture event, wherein image segmentation is executed on each of the sequential frames, the image segmentation identifying one or more relevant portions of the captured slide.

7. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a request from one or more users to monitor for a capture event during an online collaborative meeting;
   receiving presentation content from a meeting host, wherein the presentation content is indexed upon display to the one or more users;
   analyzing one or more capture applications on a device of the one or more users for the capture event in response to receiving the presentation content from the meeting host;
   determining whether the capture event has occurred based on the analyzed one or more capture applications, wherein the capture event is determined to have occurred when a screenshot sound emanating from the one or more capture applications is detected by a microphone integrated into the online collaborative meeting, and when a spike in utilization of memory resources required by the one or more capture applications and a spike in an opening and closing of the one or more capture applications during a timeframe is detected; and
   in response to determining the capture event has occurred, identifying information relating to the capture event.

8. The computer system of claim 7, wherein identifying the information relating to the capture event further comprises:
   identifying the one or more users who initiated the capture event.

9. The computer system of claim 8, further comprising:
   presenting the meeting host with the information relating to the capture event and the identity of the one or more users who initiated the capture event.

10. The computer system of claim 7, wherein the capture event is selected from a group consisting of a screenshot of the presentation content, and a recording of the presentation content.

11. The computer system of claim 7, wherein the information relating to the capture event includes:
   a number of times the capture event has taken place;
   time metadata about when the capture event occurs; and
   a correlation of the time metadata with a captured slide in the presentation content.

12. The computer system of claim 11, wherein a time varying-convolutional neural network (TV-CNN) analyzes sequential frame differences between the captured slide and on-screen content immediately prior to the capture event, wherein image segmentation is executed on each of the sequential frames, the image segmentation identifying one or more relevant portions of the captured slide.

13. A computer program product, the computer program product comprising:
   one or more computer-readable tangible storage medium and program instructions stored on at least one of the one or more tangible storage medium, the program instructions executable by a processor capable of performing a method, the method comprising:
   receiving a request from one or more users to monitor for a capture event during an online collaborative meeting;
   receiving presentation content from a meeting host, wherein the presentation content is indexed upon display to the one or more users;
   analyzing one or more capture applications on a device of the one or more users for the capture event in response to receiving the presentation content from the meeting host;
   determining whether the capture event has occurred based on the analyzed one or more capture applications, wherein the capture event is determined to have occurred when a screenshot sound emanating from the one or more capture applications is detected by a microphone integrated into the online collaborative meeting, and when a spike in utilization of memory resources required by the one or more capture applications and a spike in an opening and closing of the one or more capture applications during a timeframe is detected; and in response to determining the capture event has occurred, identifying information relating to the capture event.

14. The computer program product of claim 13, wherein identifying the information relating to the capture event further comprises:

identifying the one or more users who initiated the capture event.

15. The computer program product of claim 14, further comprising:

presenting the meeting host with the information relating to the capture event and the identity of the one or more users who initiated the capture event.

16. The computer program product of claim 13, wherein the capture event is selected from a group consisting of a screenshot of the presentation content, and a recording of the presentation content.

17. The computer program product of claim 13, wherein the information relating to the capture event includes:

a number of times the capture event has taken place;

time metadata about when the capture event occurs; and a correlation of the time metadata with a captured slide in the presentation content.

\* \* \* \* \*